United States Patent [19]

Rose

[11] 4,398,020

[45] Aug. 9, 1983

[54] PRODUCTION OF AROMATIC POLYKETONES

[75] Inventor: John B. Rose, Letchworth, England

[73] Assignee: Imperial Chemical Industries PLC, London, England

[21] Appl. No.: 367,618

[22] Filed: Apr. 12, 1982

[30] Foreign Application Priority Data

Apr. 29, 1981 [GB] United Kingdom ............... 8113231

[51] Int. Cl.³ .......................................... C08G 67/00
[52] U.S. Cl. .................................. 528/207; 528/125; 528/126; 528/128; 528/173; 528/176; 528/179; 528/190; 528/191; 528/206; 528/220; 528/223; 528/226; 528/271; 528/360
[58] Field of Search ............... 528/125, 126, 128, 173, 528/176, 190, 220, 271, 179, 360, 191, 223, 226, 206, 207

[56] References Cited

U.S. PATENT DOCUMENTS

| | | | |
|---|---|---|---|
| 3,065,205 | 11/1962 | Bonner, Jr. | 528/190 |
| 3,324,199 | 6/1967 | Tocker | 528/190 |
| 4,247,682 | 1/1981 | Dahl | 528/190 |

FOREIGN PATENT DOCUMENTS

| | | |
|---|---|---|
| 1060546 | 3/1967 | United Kingdom . |
| 1086021 | 10/1967 | United Kingdom . |
| 1164817 | 9/1969 | United Kingdom . |
| 1326144 | 8/1973 | United Kingdom . |
| 1471171 | 4/1977 | United Kingdom . |

OTHER PUBLICATIONS

Polyarylsulfones, Synthesis and Properties, Journal of Polymer Science, Part A-1, vol. 8, 2035-2047 (1970). H. A. Vogel.

*Primary Examiner*—Lester L. Lee
*Attorney, Agent, or Firm*—Cushman, Darby & Cushman

[57] ABSTRACT

Production of an aromatic polyketone by reacting in the presence of a fluoroalkane sulphonic acid the reactants selected from: (a) a mixture of (i) at least one aromatic diacyl halide WOC—Ar—COW where —Ar'— is a divalent aromatic radical, W is halogen and COW is an aromatically bound acyl halide group, which diacyl halide is polymerizable with the at least one aromatic compound of (ii), and (ii) at least one aromatic compound H—Ar'—H where —Ar'— is a divalent aromatic radical and H is an aromatically bound hydrogen atom, which compound is polymerizable with the at least one diacyl halide of (i); (b) at least one aromatic monoacyl halide H—Ar''—COW where —Ar''— is a divalent aromatic radical and H, W, and COW are as defined in (a), which monoacyl halide is self-polymerizable; and (c) a combination of (a) and (b).

10 Claims, No Drawings

PRODUCTION OF AROMATIC POLYKETONES

The present invention relates to a process for the production of aromatic polyketones.

Aromatic polyketones are thermoplastic polymers which are well known to the art. They are of significant commercial utility in view of their excellent electrical insulating and mechanical properties at high temperatures, their high strength and toughness and their excellent resistance to fire and chemicals.

It is known, e.g. from British Pat. Nos. 1,086,021 and 1,164,817, to produce aromatic polyketones by electrophilic aroylation processes which utilize a reaction between a mixture of an aromatic diacyl halide and an aromatic compound containing at least two aromatically bound hydrogen atoms, or a self-reaction of an aromatic monoacyl halide containing at least one aromatically bound hydrogen atom, or a reaction involving the use of all three types of compound, in the presence of a metallic salt, such as an Fe salt, or a $BF_3$/liquid HF mixture, these materials acting as Friedel-Crafts catalysts. Such systems do, however, have their drawbacks: for example a $BF_3$/liquid HF mixture is extremely corrosive and physiologically harmful and its use requires the employment of pressure equipment, while the use of metallic salts may lead to contamination problems in the resulting polymer.

I have now discovered a process for making aromatic polyketones which, while involving the polymerisation of an aromatic mono- or diacyl halide, does not require the use of a $BF_3$/liquid HF mixture or a metallic salt as the polymerisation catalyst.

According to the present invention there is provided a process for the production of an aromatic polyketone which comprises reacting in the presence of a fluoroalkane sulphonic acid the reactants selected from the following class:

(a) a mixture of
(i) at least one aromatic diacyl halide of formula

WOC—Ar—COW where —Ar— is a divalent aromatic radical, W is halogen and COW is an aromatically bound acyl halide group, which diacyl halide is polymerisable with the at least one aromatic compound of (a)(ii),
(ii) at least one aromatic compound of the formula

H—Ar'—H where —Ar'— is a divalent aromatic radical and H is an aromatically bound hydrogen atom, which compound is polymerisable with the at least one diacyl halide of (a)(i),
(b) at least one aromatic monoacyl halide of formula

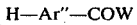

H—Ar"—COW where —Ar"— is a divalent aromatic radical and H is an aromatically bound hydrogen atom, W is halogen, and COW is an aromatically bound acyl halide group, which monoacyl halide is selfpolymerisable, and (c) a combination of (a) and (b).

Thus the process of the invention employs a fluoroalkane sulphonic acid as the polymerisation catalyst instead of a $BF_3$/liquid HF mixture or a metallic salt. While being corrosive, these sulphonic acids are far easier and safer to handle than a liquid HF/$BF_3$ mixture and do not leave metallic residues. The ability of the aromatic mono- or diacyl halides to undergo electrophilic polymerisation in the presence of these compounds is unusual and hitherto unsuspected. It is thought that the fluoroalkane sulphonic acid acts as a Lewis acid in the polymerisation. The preferred fluoroalkane sulphonic acids are trifluoromethane sulphonic acid $CF_3SO_2OH$, difluoromethane sulphonic acid $CF_2HSO_2OH$, and tetrafluoroethane sulphonic acid $CF_2HCF_2SO_2OH$. Other fluoroalkane sulphonic acids which may be used are the higher members of a series of fluoroalkane sulphonic acids containing 1 to 18 carbon atoms (which may be fully fluorinated as described in GB No. 758 467 or partially fluorinated), e.g. the fluoroethane and fluoropropane sulphonic acids such as $CF_3CF_2SO_2OH$ and $CF_3CF_2CF_2SO_2OH$. It is convenient to adjust the amount of fluoroalkane sulphonic acid used so that the acid acts as the reaction solvent. The use of a reaction system which comprises a more catalytic (i.e. much smaller) quantity of the fluoroalkane sulphonic acid is not, however, excluded from the scope of the invention.

In reaction sub-class (a), it is preferable that substantially equimolar quantities of said at least one aromatic diacyl halide and said at least one aromatic compound (as defined) are employed.

Generally speaking, to effect the process of the invention, it is convenient to dissolve or disperse the aromatic reactants in the fluoroalkane sulphonic acid followed by a period of reaction at the selected reaction temperature.

The halogen W in the aromatic mono- or diacyl halide is preferably Br or Cl, and is particularly Cl.

The at least one aromatic diacyl halide of (a)(i) is preferably selected from:

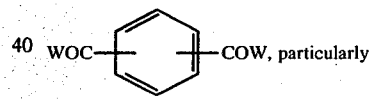

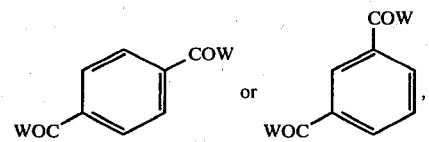

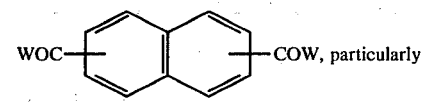

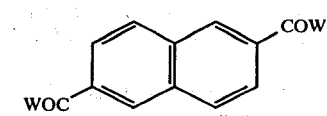

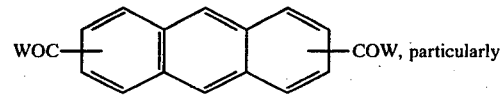

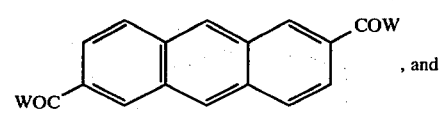

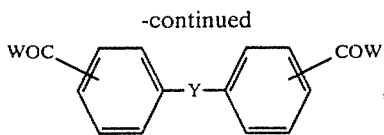

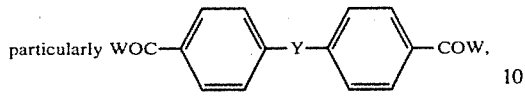, where —Y— is a direct link, —O—, —S—, —CO—, —SO$_2$—, —C(CF$_3$)$_2$— or

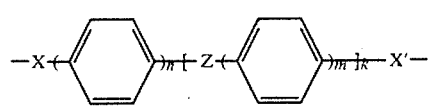

where n is 1 or 2, m is 1 or 2, k is 0 or 1, —X— and —X'— which may be the same or different are each a direct link, —O—, —S—, —CO—, —SO$_2$—, or —C(CF$_3$)$_2$—, and —Z— is —CO—, —SO$_2$—, or —C(CF$_3$)$_2$—.

The at least one aromatic compound of (a)(ii) is preferably selected from:

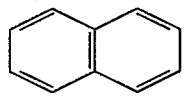

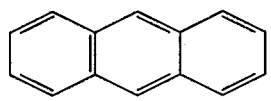

and

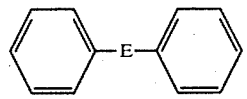

where —E— is a direct link, —O—, —S—, or

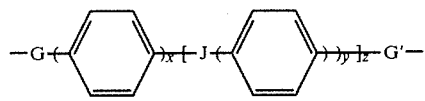

where x is 1 or 2, y is 1 or 2, z is 0 or 1, —G— and —G'— which may be the same or different are each a direct link, —O—, or —S—, and —J— is —CO—, —SO$_2$—, or —C(CF$_3$)$_2$—.

The at least one aromatic monoacyl halide of (b) is preferably selected from:

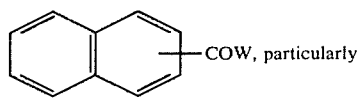

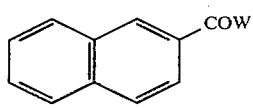

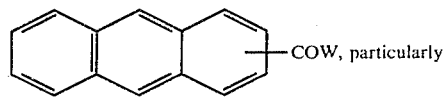

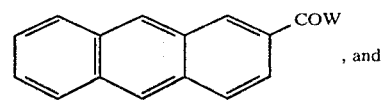, and

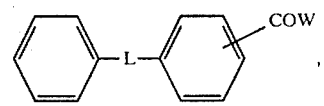, particularly

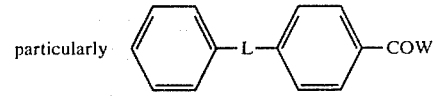

where —L— is a direct link, —O—, —S—, or

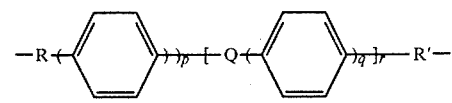

where p is 1 or 2, q is 1 or 2, r is 0 or 1, —R— is a direct link, —O—, or —S—, —R'— is a direct link, —O—, —S—, —CO—, —SO$_2$—, or —C(CF$_3$)$_2$—, and —Q— is —CO—, —SO$_2$— or C(CF$_3$)$_2$—.

The aromatic substances (as defined) which are used in the process of the invention are preferably unsubstituted in the aromatic nucleii (i.e. apart from the substituents present as indicated in the formulae in (a) and (b)); nuclear substitution tends to affect the activity of the aromatic substances in the polymerisation reaction. Nevertheless, nuclear-substituted aromatic substances may be employed in the present invention providing that the substituent or substituents do not deleteriously affect the polymerisation reaction or the properties of the polymer so produced. Whether or not the position and nature of a nuclear substituent has a deleterious effect may be discovered by experimentation.

In reactant sub-class (a)(i) of the invention, examples of aromatic diacyl halides which may be used are:

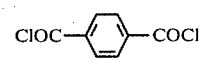

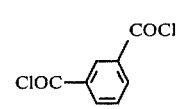

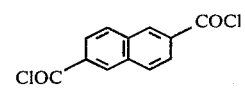

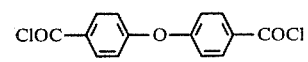

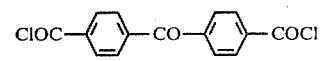

-continued

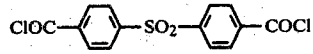
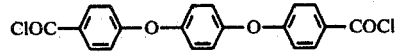
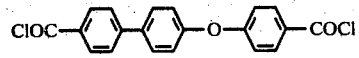
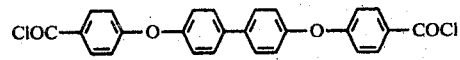

while examples of aromatic compounds in (a)(ii) which may be used are:

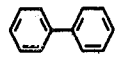
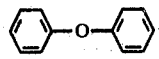
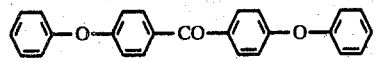
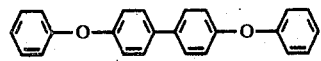
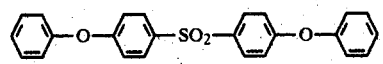
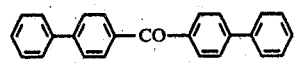
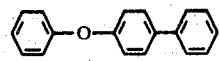

In reactant class (b) of the invention, examples of aromatic monoacyl halides which may be used are:

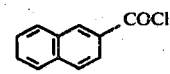
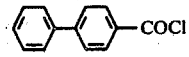
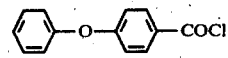
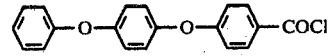
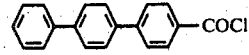

-continued

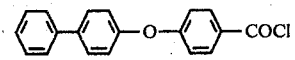
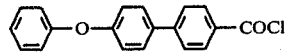
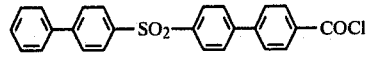
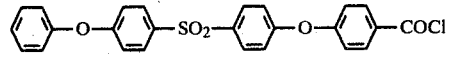
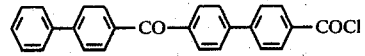
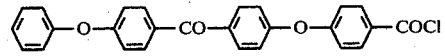

The aromatic polyketones produced by the process of the invention may have repeating units of the general formulae:

—Ar'—CO—Ar—CO— and

—Ar"—CO— according to the aromatic substances used for the polymerisation.

The monoacyl halides 4-phenoxy benzoyl chloride and 4-phenyl benzoyl chloride are particularly useful monomers to use in the process of the invention since polymerisation of the former can yield a polymer of repeat unit which is the same as that of hitherto commercially available aromatic polyketone of consisting substantially of the "all para" repeat unit

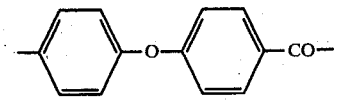

while polymerisation of the latter can yield a potentially useful polymer of consisting substantially of the "all para" repeat unit

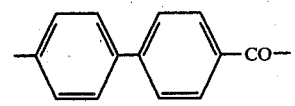

The aromatic polyketones produced by the process of the present invention normally have a reduced viscosity (RV) of at least 0.15. (RV in this specification unless otherwise specified is measured at 25° C. on a solution of the polymer in conc. sulphuric acid of density 1.84 g $cm^{-3}$, said solution containing 1 g of polymer per 100 $cm^3$ of solution).

The conditions required for the polymerisation reaction (for example, inter alia, reaction temperature and time) to produce the aromatic polyketone should be determined by experiment as they will vary with the nature of the starting monomer (or monomers) used and with the desired properties of the polymer being manufactured. Conveniently the pressure employed may be atmospheric. A normal reaction temperature range is 40° to 200° C., particularly 50° to 150° C.

The invention is now illustrated by the following Examples.

EXAMPLE 1

4-Phenyl benzoyl chloride (21.65 g, 0.1 mole) was charged to a 3-necked flask (capacity 100 ml) fitted with a thermometer, stirrer and nitrogen inlet, and condensers (leading to a nitrogen bubbler in KOH solution so that HCl evolution could be followed by titration). Trifluoromethane sulphonic acid (30 ml, 0.34 mole) was introduced (under a nitrogen blanket) at the thermometer neck (at ambient temperature—about 20° C.) using a syringe. Slow effervescence of HCl gas began immediately. The flask contents (dark red in colour) were heated to 40° C. using an oil bath and stirred at this temperature overnight. The temperature was then raised to 70° C. over 1.5 hours and maintained at this temperature for 5 hours. The viscous solution was poured into 1 liter of water and the resulting precipitate allowed to stand in the water for about 48 hours. The precipitated solid was then filtered off, ground to yield small particles (mostly less than 1 mm), washed once with 1.5 liters of boiling aqueous potassium bicarbonate solution, thrice with 1.5 liters of boiling water and twice with 1.5 liters of a 2/1 methanol/acetone mixture. The product was finally dried overnight at 120° C. in a vacuum oven.

The polymer thus produced had an nmr spectrum (220 M Hz) which showed it to be an aromatic polyketone consisting predominantly of the repeat units having the formula

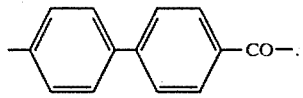

The yield of polymer obtained was 17.57 g (97.6% of theoretical) and its RV was 0.86 and final melting point, Tm, 365° C.

EXAMPLE 2

The equipment employed was that used in Example 1, and the procedure was essentially the same. 4-Phenoxy benzoyl chloride (23.25 g, 0.1 mole) was charged to the flask and trifluoromethane sulphonic acid (20 ml) added at ambient temperature (20° C.), a further quantity (10 ml) being added after about 0.5 hours (making 30 ml, 0.34 mole, added in total). The initial reaction was very vigorous. A red solution was formed initially which darkened considerably as the reaction progressed. The flask contents were stirred at ambient temperture for about 19 hours and a sample (Sample A) taken, poured into 600 ml water and worked up essentially as in Example 1. A further 20 ml of trifluoromethane sulphonic acid were added and the solution in the flask stirred for 80 hours at ambient temperature. A further sample (Sample B) was taken and worked up as per Sample A. The solution in the flask was stirred at 70° C. overnight, at 90° C. for the next day, again at 70° C. overnight, and finally at 90° C. for 2 hours the following day. The run was terminated by pouring the solution into water whereupon a white lace precipitated; this was soaked overnight in aqueous sodium bicarbonate solution and then macerated. A sample (Sample C) of this was further worked up as per Samples A and B.

The polymers of Samples A, B and C all had an nmr spectrum which showed them to be an aromatic polyketone consisting predominantly of the repeat units having the formula

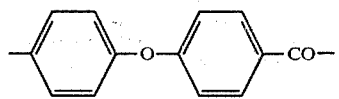

The RVs of the samples were found to be as follows:

| Sample A | RV 0.41 |
| Sample B | RV 0.76 |
| Sample C (final polymer) | RV 1.02 |

EXAMPLE 3

Terephthaloyl chloride (20.3 g, 0.1 mole) was weighed into a 3-necked flask (capacity 250 ml) fitted with a stirrer, nitrogen inlet, and condensers (leading to a nitrogen bubbler in NaOH solution). Trifluoromethane sulphonic acid (40 ml) was added to give a yellow/amber mixture with some of the terephthaloyl chloride remaining undissolved. 4,4'-Diphenoxy-benzophenone (36.64 g, 0.1 mole) dissolved in 60 ml trifluoromethane sulphonic acid was added via a dropping funnel to the stirred mixture in the flask. The reaction started and the mixture had become very viscous after about 40% of the addition; the temperature of the reaction mixture was therefore slowly increased to 40° C., and then to 50° C. by the end of the addition. Finally the reaction mixture was heated to 100° C. and left overnight. The resulting mixture was poured into water to yield a pale orange lace as a precipitate. This was washed with water, twice with warm sodium bicarbonate solution, twice with hot water and twice with warm methanol/acetone mixture. The product was finally oven dried, the weight of dry polymer being 48.2 g.

The polymer thus produced was an aromatic ketone consisting predominantly (according to its nmr spectrum) of the repeat units having the formula

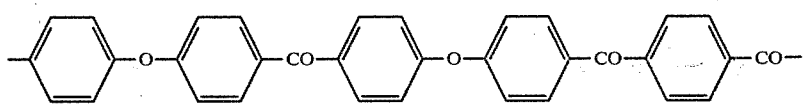

and having an RV of 0.25.

EXAMPLE 4

The equipment used was that employed in Example 3 and the procedure essentially the same. Terephthaloyl chloride (20.3 g, 0.1 mole) was charged to the flask and trifluoromethane sulphonic acid (40 ml) added to give a yellow amber mixture. 4,4'-Diphenoxy-diphenylsulphone (40.24 g, 0.1 mole) dissolved in 70 ml trifluoromethane sulphonic acid were added and the reaction contents heated after half the addition to 30° C., and then to 40° C. by the end of the addition. The temperature was increased to 50° C. for 2 hours to complete the reaction, and the reaction mixture then heated at 100° C. overnight. The mixture was poured into water to yield a buff lace as a precipitate; the work-up of this was per Example 3, the weight of dry polymer being 53.7 g.

The polymer produced had an nmr spectrum which showed it to be an aroamtic polyketone consisting predominantly of the repeat units having the formula

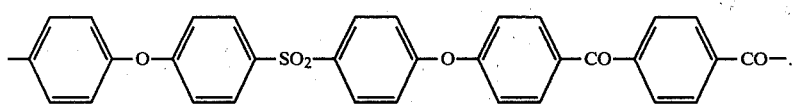

The RV of the polymer was 0.35 and it had a melting point Tm of 380° C.

EXAMPLE 5

The equipment used was that employed in Example 3. Terephthaloyl chloride (30.45 g, 0.15 mole) was weighed into the flask and 95 ml trifluoromethane sulphonic acid added to give a pale yellow solution. Diphenyl ether (25.53 g, 0.15 mole) was dissolved in 50 ml of trifluoromethane sulphonic acid to give a deep red solution. This was gradually added, via a dropping funnel, to the stirred flask contents at 22° to 32° C. over 2.5 hours. The reaction mixture (a viscous solution) was then heated to 100° C. over 45 minutes and left at 105° C. for 19 hours. A sample of the mixture was poured into water to yield a precipitate which was worked up as per Example 3.

The polymer produced had an nmr spectrum which showed it to be an aromatic polyketone consisting predominantly of repeat units of formula

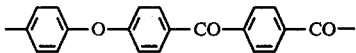

The RV of the polymer was 0.23.

EXAMPLE 6

The equipment used was that employed in Example 3. DiPhenyl (9.25 g, 0.06 mole) and 4,4'-diphenoxy-diphenylsulphone (24.15 g, 0.06 mole) were weighed into the flask and 75 ml trifluoromethane sulphonic acid added to give a pale orange-brown solution. A solution of terephthaloyl chloride (24.36 g, 0.12 mole) in 50 ml of trifluoromethane sulphonic acid was carefully prepared and added via a dropping (warming occasionally to prevent the terephthaloyl chloride from crystallising out of solution) over 2.5 hours at 25° to 35° C. The reaction mixture was then heated to 100° C. and kept at 105° C. for 19 hours. A sample of the mixture was worked up as per Example 3.

The polymer produced was an aromatic polyketone copolymer consisting predominantly of repeat units of formulae

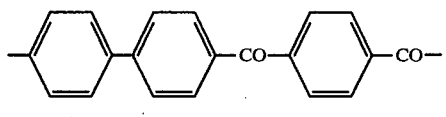

and

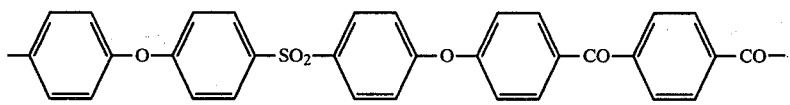

having an RV of 0.17.

I claim:

1. A process for the production of an aromatic polyketone which comprises reacting at a temperature of from 40° to 200° C. in the presence of a fluoroalkane sulphonic acid the reactants selected from the group consisting of:
   (a) a mixture of substantially equimolar amounts of
     (i) at least one aromatic diacyl halide of formula WOC—Ar—COW where —Ar— is a divalent aromatic radical, W is halogen and COW is an aromatically bound acyl halide group, which diacyl halide is polymerisable with the at least one aromatic compound of (a)(ii), and
     (ii) at least one aromatic compound of formula H—Ar'—H where —Ar'— is a divalent aromatic radical and H is an aromatically bound hydrogen atom, which compound is polymerisable with the at least one diacyl halide of (a)(i)
   (b) at least one aromatic monoacyl halide of formula H—Ar''—COW where —Ar''— is a divalent aromatic radical and H is an aromatically bound hydrogen atom, W is halogen, and COW is an aromatically bound acyl halide group, which monoacyl halide is self-polymerisable, and
   (c) a combination of (a) and (b).

2. A process according to claim 1 wherein the fluoroalkane sulphonic acid used is trifluoromethane sulphonic acid or difluoromethane sulphonic acid.

3. A process according to claim 1 wherein the amount of fluoroalkane sulphonic acid used is such that the fluoroalkane sulphonic acid acts as a reaction solvent.

4. A process according to claim 1 wherein the halogen W in the aromatic mono- or diacyl halide is Br or Cl.

5. A process according to claim 1 wherein the at least one aromatic diacyl halide of (a) (i) is selected from the group consisting of:

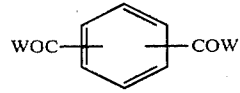

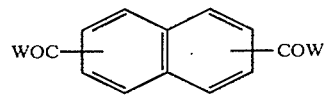

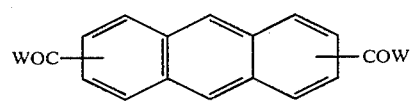

and

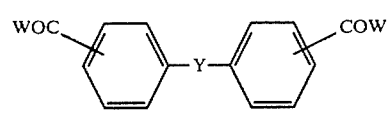

where —Y— is a direct link, —O—, —S—, —CO—, —SO$_2$—, —C(CF$_3$)$_2$—, or

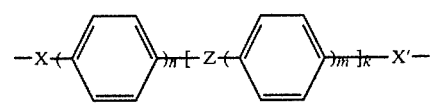

where n is 1 or 2, m is 1 or 2, k is 0 or 1, —X— and —X'— which may be the same or different are each a direct link, —O—, —S—, —CO—, —SO$_2$—, or —C(CF$_3$)$_2$—, and —Z— is —CO—, —SO$_2$—, or —C(CF$_3$)$_2$—.

6. A process according to claim 5 wherein the at least one aromatic diacyl halide is selected from the group consisting of:

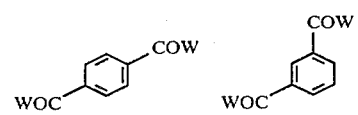 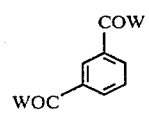

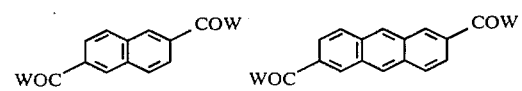

and

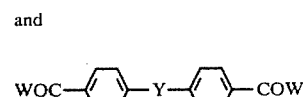

7. A process according to claim 1 wherein the at least one aromatic compound of (a) (ii) is selected from the group consisting of:

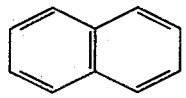

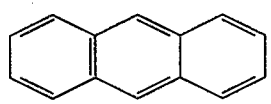

and

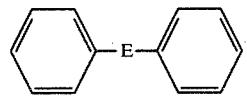

where —E— is a direct link, —O—, —S—, or

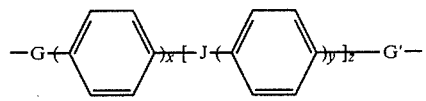

where x is 1 or 2, y is 1 or 2, z is 0 or 1, —G— and —G'— which may be the same or different are each a direct link, —O—, or —S—, and —J— is —CO—, —SO$_2$—, or —C(CF$_3$)$_2$—.

8. A process according to claim 1 wherein the at least one aromatic monoacyl halide of (b) is selected from the group consisting of:

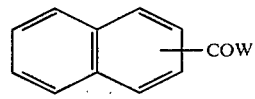

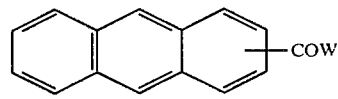

and

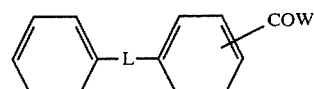

where —L— is a direct link, —O—, —S—, or

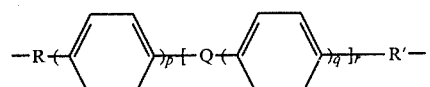

where p is 1 or 2, q is 1 or 2, r is 0 or 1, —R— is a direct link, —O—, or —S—, —R'— is a direct link, —O—, —S—, —CO—, —SO$_2$—, or —C(CF$_3$)$_2$—, and —Q— is —CO—, —SO$_2$— or —C(CF$_3$)$_2$.

9. A process according to claim 8 wherein the at least one aromatic monoacyl halide is selected from the group consisting of:

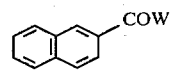 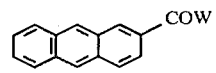

-continued
and
-continued
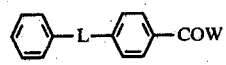
10. A process according to claim 8 wherein the at least one aromatic monoacyl halide is selected from 4-phenyl benzoyl chloride and 4-phenoxy benzoyl chloride.
* * * * *